Jan. 6, 1953     G. VON DER WERTH     2,624,381

LAMINATED METAL CIRCULAR AND BAND SAWS

Filed April 29, 1950     2 SHEETS—SHEET 1

INVENTOR.
Gordon von der Werth
BY
Boyken, Mohler & Beckley
Attorneys.

Jan. 6, 1953  G. VON DER WERTH  2,624,381
LAMINATED METAL CIRCULAR AND BAND SAWS
Filed April 29, 1950  2 SHEETS—SHEET 2

INVENTOR.
Gordon von der Werth
BY
Boyken, Mohler & Beckley
ATTORNEYS.

Patented Jan. 6, 1953

2,624,381

UNITED STATES PATENT OFFICE 2,624,381

LAMINATED METAL CIRCULAR AND BAND SAWS

Gordon von der Werth, San Francisco, Calif.

Application April 29, 1950, Serial No. 159,000

5 Claims. (Cl. 143—133)

This invention relates to circular saws and to band saws, and has for one of its objects the provision of a saw of either of the above types that has a longer life and greater work capacity than present saws, and which saws are thinner and have less kerf than conventional saws intended for the same purpose and of the same diameter or width to whether it is a circular saw or a band saw.

Another object of the invention is the method of making saws having the above noted improved characteristics.

Saws available at the present time, whether they are circular saws or band saws have the objections of becoming destructively hot under normal use as practiced in the various industries, with the result of seriously injuring the saws, sometimes irreparably, and of burning the wood or material being cut. Many times the cutting edges of the teeth become annealed, requiring the saw to be resharpened.

The method employed heretofore for minimizing these objections, has been to make the saws of heavier gauge and wider kerfs, even though these characteristics obviously introduced the additional disadvantages of requiring increased horse power, and more material in the saws, and greater loss in the material worked on. The thickening of the saw blade and the greater kerf merely tended to reduce the frequency with which the saws required sharpening or reconditioning, inasmuch as the saws still are highly susceptible to the injuries that necessitated their thickening and the widening of the kerfs, but further thickening and further widening of kerfs is unpractical, both because of the additional wastage and expense, and the fact that such thickening and widening appeared to augment the general troubles.

It is one of the objects of the present invention to produce a saw that is substantially free from all of the objections to present saws of similar size and type, and which saw is of lighter gauge and has a narrower kerf than said present saws.

Other objects and advantages will appear in the description.

In the drawings, Fig. 1 is a side view of a circular saw. Figs. 2, 3, 4, 5 are sectional views taken through a saw, such as along line 2—2 of Fig. 1 showing successive steps in producing the saw of Fig. 2. The dimensions are greatly exaggerated.

Fig. 6 merely shows a side view of a band saw that has been produced by the same steps as shown in Figs. 2, 3, 4, 5.

Figure 1:
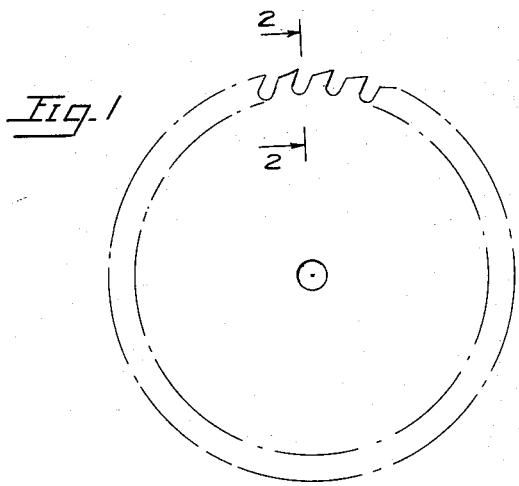
Figure 2:
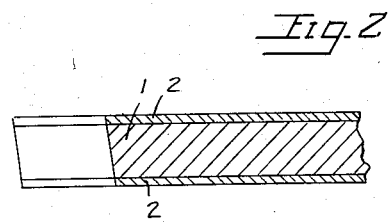
Figure 3:
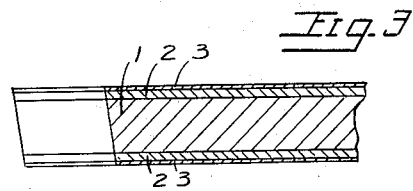
Figure 4:
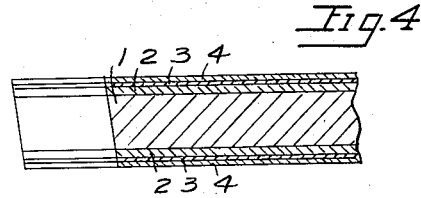
Figure 5:
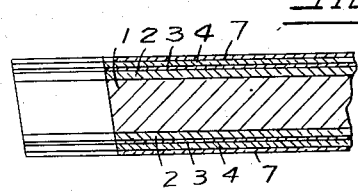
Figure 6:

The basic foundation for the present saw, whether circular or band, is to provide a steel disk or strip that may or may not have the teeth cut therein and set.

In the case of a circular saw, the metal is hammered in the conventional manner for tensioning or insuring a tight rim adjacent the cutting teeth. However, the gauge is preferably lighter than the gauge heretofore employed for a saw for the service and type of work specified. It may be the same gauge, if desired, and will still have many advantages over the present saws, but heretofore it has been impossible to obtain commercially a saw of as light a gauge as this invention makes possible, and inasmuch as certain advantages follow from use of a lighter gauge saw than heretofore has been available, the steel saw or blank that is used as the basic foundation for making the present saw will ordinarily be of a relatively light gauge, say 16 or 18 gauge for a saw having a diameter of about 16 inches, and having from about 24 to 30 teeth and a desired speed of say about 10,000 rim feet per minute. A conventional saw of the above specifications would be no lighter than 13 gauge metal.

The initial step in the present method is to plate the steel blank, or saw 1 with a layer of copper 2. In the case of a 16 inch saw of 16 or 18 gauge metal, a layer of copper of about one to one and one-half thousandths of an inch has been found to be satisfactory. The plating is done by the usual electroplating method as is the case in each plating step herein employed.

After the layer of copper is deposited on the saw, the next step is to deposit metal layer 3 of say about a quarter to three-quarters of a thousandth of an inch over the saw. This metal may be one having about the heat transfer characteristics of nickel, and nickel is satisfactory. Nickel has relatively poor heat transfer characteristics as compared with copper, the latter having excellent heat transfer characteristics. One half of a thousandth of an inch is very satisfactory for the thickness of the nickel.

A second layer of copper 4 is then deposited over the nickel by plating, in a thickness of say about three-quarters to one and a quarter thousandths of an inch. One one-thousandth of an inch is usually quite satisfactory for the thickness of the second copper layer. The next step is to bond a layer of chromium 7 to the copper, by plating, the chromium 7 being say about one-half to about one thousandth of an inch in thickness. A white nickel wash is preferably applied to the second layer of copper in a thickness to insure good bonding of the chromium to the copper. This is a normal procedure when chromium is plated on copper.

From the foregoing, it is seen that what is produced is virtually a laminated saw 1, having on each side of the central steel body two layers of metal of relatively high heat conductivity, preferably copper, separated by a thinner heat insulator of metal characterized by having relatively low heat conductivity. The outermost layers are of a relatively hard metal, preferably chromium, resistant to wear and abrasion as well as to corrosion. This latter characteristic is particularly important in the redwood industry inasmuch as the acid in the wood causes objectionable corrosion.

The following specifications will clearly show the differences between a 16 inch diameter circular steel saw of the minimum thickness now available and recommended by manufacturers, and applicant's saws.

*Present saw*

| | |
|---|---|
| Gauge | 13 |
| Diameter | 16 inches |
| Kerf | ¼ inch (recommended) |
| Center opening | 1 inch |
| Solid tooth. | |
| No. of teeth | 24 to 36 |
| Recommended speed | 10,000 rim feet per minute |

*Saw of present invention*

(16 gauge)

| | |
|---|---|
| Gauge | 16 |
| Diameter | 16 inches |
| Kerf (maximum) | ⅛ inch |
| Kerf (minimum) | 3/32 inch |
| Center hole | 1 inch |
| Solid tooth. | |
| No. of teeth | 24 to 30 |
| Speed | 16,600 rim feet per minute |

*Saw of present invention*

(18 gauge) multiple ply construction

| | |
|---|---|
| Gauge | 18 |
| Diameter | 16 inches |
| Kerf (maximum) | ⅛ inch |
| Kerf (minimum) | 5/64 inch |
| Center hole | 1 inch |
| Solid tooth. | |
| No. of teeth | 24 to 30 |
| Speed | 16,600 rim feet per minute |

In the above instances, the saws are of identically the same steel, and the work was identical.

The number of plies, the relative thickness of the copper-nickel-copper may be varied to meet specific requirements. Insofar as results are concerned, even the omission of the nickel and outer copper layer, using only a single layer of copper with an exterior surface of chromium will be an improvement over the conventional saw, and will permit use of a body of lighter gauge steel than heretofore. However, the specifications above given are found to be highly satisfactory where wet redwood is to be cut.

In the case of a band saw, the same advantages follow as in the case of the circular saw. The saws may be run faster than heretofore, and the kerf may be kept at a minimum because of their cooler operation.

At the present time, where an ordinary circular saw is used, they are undesirably sensitive to uneven heat. The heat that is transmitted by conduction by the teeth or from side friction, quite frequently is so unevenly distributed that the blade plane is so seriously misaligned as to require stoppage and replacement of the saw. Also, this poor heat transmission frequently causes burning of the material being sawed. Whenever misalignment takes place, the friction situation is aggravated, and the expansion of the steel immediately becomes so great as to be far beyond the capacity of the steel to conduct and to distribute the heat.

At the present time the only attempted solutions to the above objection (which are not solutions, but merely means for delaying the ultimate necessity for replacing the saw) are:

(1) Keeping the cutting teeth sharp to reduce the heat generated from the cutting operation.

(2) Use of a very wide kerf (with resultant prohibitive waste of material) to reduce friction against sides of blade.

(3) Use of water to cool blade (thus preventing use of a blower to remove dust).

(4) Attempts to run blade in vertical plane only to reduce side friction, which is not always possible.

(5) The ultimate and most frequent recommendation is to use a heavier gauge saw resulting in increased kerf and horsepower.

This inability of the saws to conduct heat from partially dull teeth is so pronounced that the teeth frequently anneal, which obviously results in a completely dull saw and an aggravated heat condition that immediately renders the saw unfit for use until it is re-sharpened, assuming the damage has not been too great.

Also, the inability of present saws to conduct the heat away and to distribute and dissipate it uniformly and quickly during such conduction results in the uneven expansion of the peripheral portion of the blade causing distortion in the cut made by the saw. Straight line cutting becomes impossible.

The rapid generation of heat in saws of the conventional structure results in frequent damaging shut downs to make repairs and in some instances the heat generates so fast without adequate distribution or dissipation that the blade is damaged or ruined before the shut down is possible. Also there is likelihood of injury to workmen in the mill whenever the saws start to run excessively hot.

With the laminated saws of the present invention, where wood is being cut, the saws will not burn the material if the material or feed is stopped while the saw is still running in the cut. This is not the case of conventional saws, and with saws of this invention, the wood will not burn even if the saw is dull.

Furthermore, in the case of saws made in accordance with the present invention, the blades run far cooler than conventional steel blades whether dull or sharp, and the use of cooling water is normally unnecessary.

The teeth of the blades made in accordance with the present invention will not become annealed under circumstances where the teeth of conventional saws will quickly anneal.

Also in the case of the present invention, the blade can continue to be run in the case of a swage set, for example, far beyond limit of the minimum kerf recommended for ordinary blades and without fear of damage to tension.

The heat that is developed by the teeth due to the cutting operation is normally relatively uniform, and this is rapidly and uniformly conducted away from the teeth and dissipated by the copper layer that is adjacent to the blade. In other words, by reference to Figs. 2 to 5 and 7, 8, it is seen that the copper layers cover the sides of the blades to the extremity of the rim portion thereof, so that when the teeth are set (Figs. 7, 8) the layers completely cover the sides of the teeth.

Figure 7:
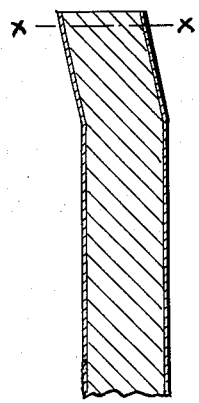
Figs. 7, 8 are enlarged fragmentary sectional views respectively taken through a plated spring set tooth and a plated swage set tooth, each indicating the plurality of layers of plating on each side of the tooth as a single layer for simplicity and clarity.
Figure 8:
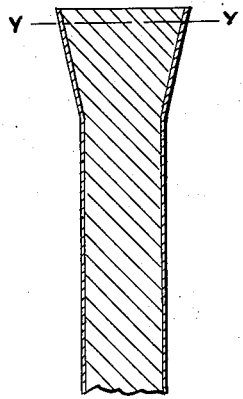

The layers of plating on each side of each blade are indicated in Figs. 7, 8 as a single layer for purpose of clarity.

By virtue of the copper positioning on the teeth, the cutting edges are caused to wear down substantially uniformly and the relatively sharp edges are retained. Line $x-x$ in Fig. 7, and line $y-y$ in Fig. 8, indicate the cutting edges of the saw when worn to each of said lines, and in Fig. 11 the dotted lines 10 indicate a tooth before wear while the full line indicates how the cutting edge recedes, but retains its sharpness.

In explanation of the foregoing, in saw steel the teeth of the saw have the characteristic of hardening under heat to a certain degree or point. When this point is exceeded, the steel anneals, and causes the cutting edges to wear exceedingly fast. A relatively slight dulling of the teeth in a conventional saw is sufficient to cause an increase in temperature to the annealing point.

Figure 9:
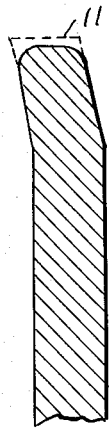
Figs. 9, 10 are enlarged, fragmentary sectional views taken through worn spring set and swage set conventional teeth respectively.
Figure 10:
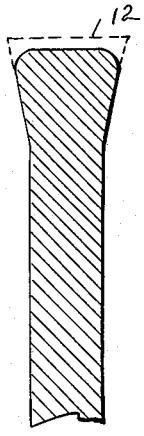
Figure 12:
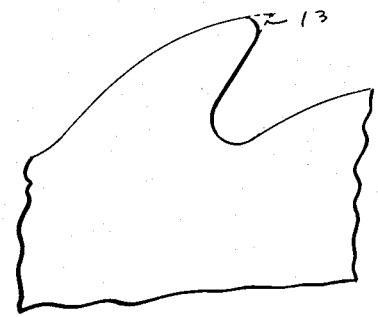
Fig. 12 is a fragmentary side view of a tooth on a conventional unplated saw illustrating the character of wear that takes place.

Figs. 9, 10, and 12 a conventional saw is shown, illustrating the manner in which wear and annealing of the cutting edge blunts the latter. The dotted lines 11, 12 in Figs. 9, 10 respectively indicate the bottom of the sharp teeth before wear has occurred. Obviously when this occurs, the rate of heating is greatly increased and the saw must be resharpened, provided the heating has not been so severe as to destroy its shape and temper.

Where the heat is controlled to the point of hardening only on the cutting edge and so it will not exceed this point, it follows that the cutting edges will not anneal and become rounded. The copper layer conducts the heat away from the cutting edge sufficiently fast under normal force feed operation of the saw, to prevent the temperature along the cutting edges from exceeding the hardening point and reaching an annealing temperature.

Figure 11:
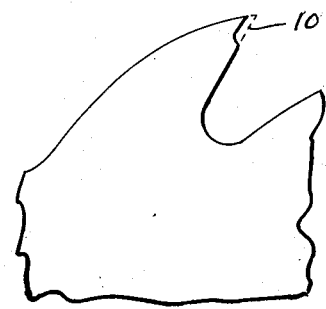
Fig. 11 is a fragmentary side view of a saw tooth plated in accordance with the present invention illustrating the character of wear that takes place.

In Fig. 11, the wear on the face of the tooth is due to friction from the chips, and the sharp cutting edge is retained for effective cutting as the face of the tooth is worn away. The dotted line 13 in Fig. 12 indicates the sharp cutting edge of a tooth in a conventional saw before wear has occurred.

In the case of the heat due to side friction, this is not usually uniform, but is spot heating. The copper adjacent the chromium, will rapidly conduct the heat away from the localized spot. The nickel acts on the order of an insulator, although it will conduct the heat to the copper adjacent the blade, which is desirable. It prevents any heat from side friction reaching the blade so rapidly as to cause objectionable distortion of the blade, and the expansion of the blade is relatively uniform. The blade plane is not destroyed if the blade is warmed slowly and evenly, and that is the worst that occurs in the present instance.

The blades made in accordance with the present invention will stand abuse to a degree far beyond that which conventional blades will stand.

The ply construction material, having stresses built up in the several faces of metals, is far more rigid than any solid steel blade of comparable gauge. This rigidity is essential in a thin blade.

The high straight line cutting performance of the present blades has been mentioned already. Conventional solid steel blades have a low straight line cutting performance, particularly when they have become partially dull.

It is by reason of this advantage that the present blades are particularly suitable for running in tandem pairs, and such tandem and single blades may be run in a horizontal plane under conditions where ordinary blades cannot be used.

The specifications of the present saw show that they may be run much faster than ordinary blades. Such higher speeds result in reducing individual tooth pressure, and in permitting increased feed or capacity.

The reduced kerf width is quite important, particularly where wood is cut into relatively small length as in making shakes or in the pencil industry. The present invention enables reducing the kerf width in half and more, with a corresponding substantial saving in material and consequent increase in profit.

It is to be understood that the multiple layers of copper, nickel, and copper may be repeated and in certain saws, this has been found highly desirable, such as in large log saws or relatively thin saws.

It is obvious, of course, that insofar as this invention is concerned, the teeth may or may not be of specially treated steel for hardness such as metal known as "Carboloy" or "Stellite," etc. A typical example wherein this invention is adapted to a solid tooth Carboloy saw, the plating joins the bonding metal of the teeth, but does not cover the Carboloy teeth themselves. In such solid tooth saws the "Carboloy" or hardened metal is only on the tips of the teeth hence the plating covers the major portion of each tooth and the layer 4 of copper functions to prevent the heat created by surface friction developed between the sides of the saw and the material being sawed from reaching the body of the saw to a detrimental degree, while the heat from the teeth will be dissipated to layer 2. This counterflow of heat with the insulating layer 3 between the inner and outer layers of copper results in preventing any detrimental hot spots from developing in the sides of the blades, as has heretofore been the frequent cause of ruining blades having Carboloy tips on the teeth and it also prevents burning of the wood along the teeth sides due to heat developed at the cutting edges of the teeth.

Insofar as the insulting layer of metal is concerned, any metal that has substantially slower heat transfer characteristics than copper may be used, such as antimony or an antimony alloy, chromium, nickel, etc. Where chromium is used, the use of the conventional nickel wash promotes bonding of the copper thereto. Antimony is relatively stiff and hard, thus having the desirable characteristic of stiffening the thinner blades. When alloyed with a softer metal, there may be a slight sacrifice in stiffness for the advantage of reduced brittleness, inasmuch as straight antimony is relatively brittle. A nickel alloy such as German silver would also be suitable provided the plating can be satisfactorily accomplished by the electroplating process.

It is obvious that platinum, silver, or a combination thereof could be used instead of copper, but the cost would be prohibitive in saws of any size. The heat transfer characteristics of copper being so close to that of the more expensive metals that copper is preferred and is a practical metal to use.

I claim:

1. A saw comprising a central body of steel having cutting teeth along the edge thereof, laminae of copper and a metal of relatively lower heat conductivity than said copper extending to the cutting edges of said teeth inseparably secured to each of the opposite sides of said body with a lamina of copper nearest said body on each of said sides.

2. A saw comprising a central body of steel having cutting teeth along the edge thereof, laminae of copper and nickel and chromium inseparably secured to each of the opposite sides of said body with a lamina of said copper being nearest each of said opposite sides and a lamina of chromium outermost relative to said body the said layers of copper, nickel and chromium extending to the cutting edges of said teeth.

3. A saw comprising a central body of steel having cutting teeth along the edge thereof, a layer of copper bonded to each of the opposite sides of said body and completely covering each of said opposite sides and extending to the cutting edges of said teeth, and an outer layer of metal substantially harder than said copper secured to the latter outwardly thereof relative to said body.

4. A saw comprising a central body of steel having cutting teeth extending along the edge thereof and a plurality of successive layers of electrically deposited metal integral therewith and with each other covering each of the opposite sides of said body and extending to the cutting edges of said teeth, the said layers on each side in succession from said body being copper, nickel, copper and chromium, the layer of copper nearest said body on each opposite side thereof being thicker than the layer of nickel.

5. A saw comprising a central body of steel having cutting teeth along the edge thereof, a first layer of copper bonded to each of the opposite sides of said body, a second layer of copper on said body outwardly of said first layer, an intermediate layer of metal between said first and said second layer having substantially poorer heat conducting characteristics than said first and said second layer, an outermost layer of metal on said body outwardly of said second layer and said outermost layer being substantially harder than the copper of said first and second layers, all of the aforesaid layers extending over the opposite sides of said body and over the sides of said teeth to points adjacent to the cutting edges of the latter.

GORDON von der WERTH.

REFERENCES CITED

The following references are of record in the file of this patent:

UNITED STATES PATENTS

| Number | Name | Date |
|---|---|---|
| 1,631,212 | King | June 7, 1927 |
| 1,787,477 | Hanley | Jan. 6, 1931 |
| 1,931,704 | Moore | Oct. 24, 1933 |
| 2,061,056 | Baker | Nov. 17, 1936 |
| 2,252,893 | Macklin | Aug. 19, 1941 |
| 2,316,119 | Bagley | Apr. 6, 1943 |
| 2,381,941 | Wellman | Aug. 14, 1945 |
| 2,428,033 | Nachtman | Sept. 30, 1947 |

FOREIGN PATENTS

| Number | Country | Date |
|---|---|---|
| 504,275 | Germany | Aug. 4, 1930 |
| 683,231 | Germany | Nov. 2, 1939 |